United States Patent
Koya et al.

(10) Patent No.: US 8,103,683 B2
(45) Date of Patent: Jan. 24, 2012

(54) CONVERTING BETWEEN SOFTWARE OBJECTS

(75) Inventors: Venkat Koya, Suwanee, GA (US); Faiyaz Shikari, Cumming, GA (US)

(73) Assignee: Affiliated Computer Systems, Inc., Dallas, TX (US)

( * ) Notice: Subject to any disclaimer, the term of this patent is extended or adjusted under 35 U.S.C. 154(b) by 297 days.

(21) Appl. No.: 12/416,746

(22) Filed: Apr. 1, 2009

(65) Prior Publication Data

US 2009/0271426 A1    Oct. 29, 2009

Related U.S. Application Data

(60) Provisional application No. 61/048,810, filed on Apr. 29, 2008.

(51) Int. Cl.
  *G06F 7/00* (2006.01)
(52) U.S. Cl. ............................. 707/756; 707/809
(58) Field of Classification Search .................. 707/705, 707/755–756, 791, 792, 803, 809, 999.101, 707/999.104, E17.001, E17.124
See application file for complete search history.

(56) References Cited

U.S. PATENT DOCUMENTS

| | | | | |
|---|---|---|---|---|
| 6,429,882 B1 * | 8/2002 | Abdelnur et al. | ............. | 715/763 |
| 6,865,573 B1 * | 3/2005 | Hornick et al. | ............... | 707/748 |
| 6,917,944 B1 * | 7/2005 | Prasad et al. | .................. | 707/781 |
| 7,480,894 B2 * | 1/2009 | Hasson et al. | ................ | 717/115 |
| 7,711,680 B2 * | 5/2010 | Barnes-Leon et al. | ........ | 717/102 |
| 7,720,691 B2 * | 5/2010 | Hasan et al. | ....................... | 705/2 |
| 7,743,078 B2 * | 6/2010 | Azvine et al. | ................ | 707/803 |
| 7,747,569 B2 * | 6/2010 | Comi et al. | ................... | 707/610 |
| 7,756,882 B2 * | 7/2010 | Aharoni et al. | ............... | 707/756 |
| 7,809,768 B2 * | 10/2010 | Owens et al. | ................. | 707/803 |
| 7,870,412 B2 * | 1/2011 | Maes | ............................. | 713/400 |
| 2003/0208595 A1 * | 11/2003 | Gouge et al. | .................. | 709/225 |
| 2006/0095288 A1 * | 5/2006 | Amys et al. | ....................... | 705/1 |
| 2006/0161560 A1 * | 7/2006 | Khandelwal et al. | ......... | 707/100 |

OTHER PUBLICATIONS

Matic, D. 'Data Access Architecture in Object Oriented Applications Using Design Patterns'. Electrotechnical Conference, 2004. Melecon 2004. Proceedings of the 12th IEEE Mediterranean, p. 597-598 Vol. 2 <Url: http://ieeexplore.ieee.org/stamp/stamp.jsp?tp=&arnumber=1347000>.*

Mahmoud, "Getting Started with the Java Rule Engine API (JSR 94): Toward Rule-Based Applications," http://java.sun.com/developer/technicalArticles/J2SE/JavaRule.html, downloaded from the Internet Jun. 3, 2011, 11 pages.

\* cited by examiner

*Primary Examiner* — Robert Timblin
*Assistant Examiner* — Randall Burns
(74) *Attorney, Agent, or Firm* — Grant Rodolph; Conley Rose, P.C.

(57) ABSTRACT

A computer program product is provided. The product comprises a computer usable medium having a computer readable program code embodied therein, the computer readable program code adapted to be executed to implement a method for converting between data objects constructed according to different software technologies. The method comprises providing a system comprising distinct software modules to perform the converting between data objects and processing a properties file to identify a first class associated with a first software technology based on a second class associated with a second software technology. The method also comprises analyzing the first class to identify a first attribute of the first class. The method also comprises constructing a first object of the first class and assigning a first value to the first attribute of the first object based on a second value of a second attribute of a second object of the second class.

15 Claims, 12 Drawing Sheets

CONVERTING BETWEEN SOFTWARE OBJECTS

CROSS-REFERENCE TO RELATED APPLICATIONS

This application claims priority to U.S. Provisional Application Ser. No. 61/048,810 filed Apr. 29, 2008, and entitled "MMIS Health Enterprise Solution," by Jack Devos, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The United States Medicaid program was enacted in 1965 to provide a medical assistance program for individuals and families with low incomes. The Medicaid program comprises three main entities—the patients, the healthcare providers, and the agency administering the plan (i.e., the payer). The Medicaid program is financed through joint federal and state funding. The Medicaid program is administered by each state according to an approved state plan. The specifics of the Medicaid program differ from state to state. Differences may include covered healthcare procedures, allowable procedure costs, and patient eligibility criteria. The state administrators of the Medicaid program are required to have a Medicaid management information system (MMIS) that provides for mechanized and/or computerized Medicaid claims processing. Recently, the Medicaid information technology architecture (MITA) has been promulgated by the U.S. government to provide a blueprint and a set of standards that individual states are to follow in administering the Medicaid program and for developing the next generation MMIS.

SUMMARY

In an embodiment, a computer program product is disclosed. The computer program product comprises a computer usable medium having a computer readable program code embodied therein, the computer readable program code adapted to be executed to implement a method for converting between data objects constructed according to different software technologies. The method comprises providing a system, wherein the system comprises distinct software modules, and wherein the distinct software modules comprise a first converter module, a second converter module, and a properties loader module. The method also comprises processing a first properties file to identify a first class associated with a first software technology based on a second class associated with a second software technology, wherein the processing the first properties file is performed by the properties loader module in response to being called by the first converter module. The method also comprises receiving, by the first converter module, the identification of the first class from the properties loader module and analyzing, by the first converter module, the first class to identify a first attribute and a first method. The method also comprises constructing, by the first converter module, a first object of the first class and assigning, by the first converter module, a first value to the first attribute of the first object using the first method, wherein the first value is based on a second value of a second attribute of a second object of the second class.

In an embodiment, a computer implemented method of processing a healthcare management information system transaction is disclosed. The method comprises receiving a transaction request comprising a parameter value, constructing a first object of a first class, wherein the first class is associated with a first software technology, and assigning the parameter value to a first attribute of the first object. The method also comprises identifying a second class based on the first class by referencing a first properties file, wherein the second class is associated with a second software technology. The method also comprises analyzing the second class to identify a second attribute of the second class and a first method of the second class and constructing a second object of the second class. The method also comprises invoking the first method on the second object to assign the value of the second attribute of the second object based on the value of the first attribute of the first object. The method also comprises transmitting the second object in a first message to a process layer, in response to receiving the second object.

In an embodiment, a computer implemented method of processing a healthcare management information system transaction is disclosed. The method comprises a user interacting with an interface screen presented by a portal layer of the healthcare management information system by inputting a parameter value associated with a transaction request. The method further comprises receiving the transaction request comprising the parameter value, constructing a first object of a first class, wherein the first class is associated with a first software technology, and assigning the parameter value to a first attribute of the first object. The method also comprises identifying a second class based on the first class by referencing a first properties file, wherein the second class is associated with a second software technology. The method also comprises analyzing the second class to identify a second attribute of the second class and a first method of the second class and constructing a second object of the second class. The method also comprises invoking the first method on the second object to assign the value of the second attribute of the second object based on the value of the first attribute of the first object. The method also comprises transmitting the second object in a first message to a process layer. The method further comprises processing the second object and returning a response associated with the processing to the interface screen to present a result of the processing to the user.

In an embodiment, a system for processing healthcare management information system transactions is disclosed. The system comprises a processor, a portal layer application, and an object conversion application. The portal layer application, when executed by the processor, receives and replies to requests to perform transactions. The object conversion application, when invoked by the portal layer application, receives a transaction message containing a first object of a first class, the first object comprising a first attribute, constructs a second object of a second class, assigns a value to a second attribute of the second object based on performing introspection on the second class and based on the first attribute of the first object. The portal layer further sends a request containing the second object to a process layer for processing of the transaction.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Figure 1:
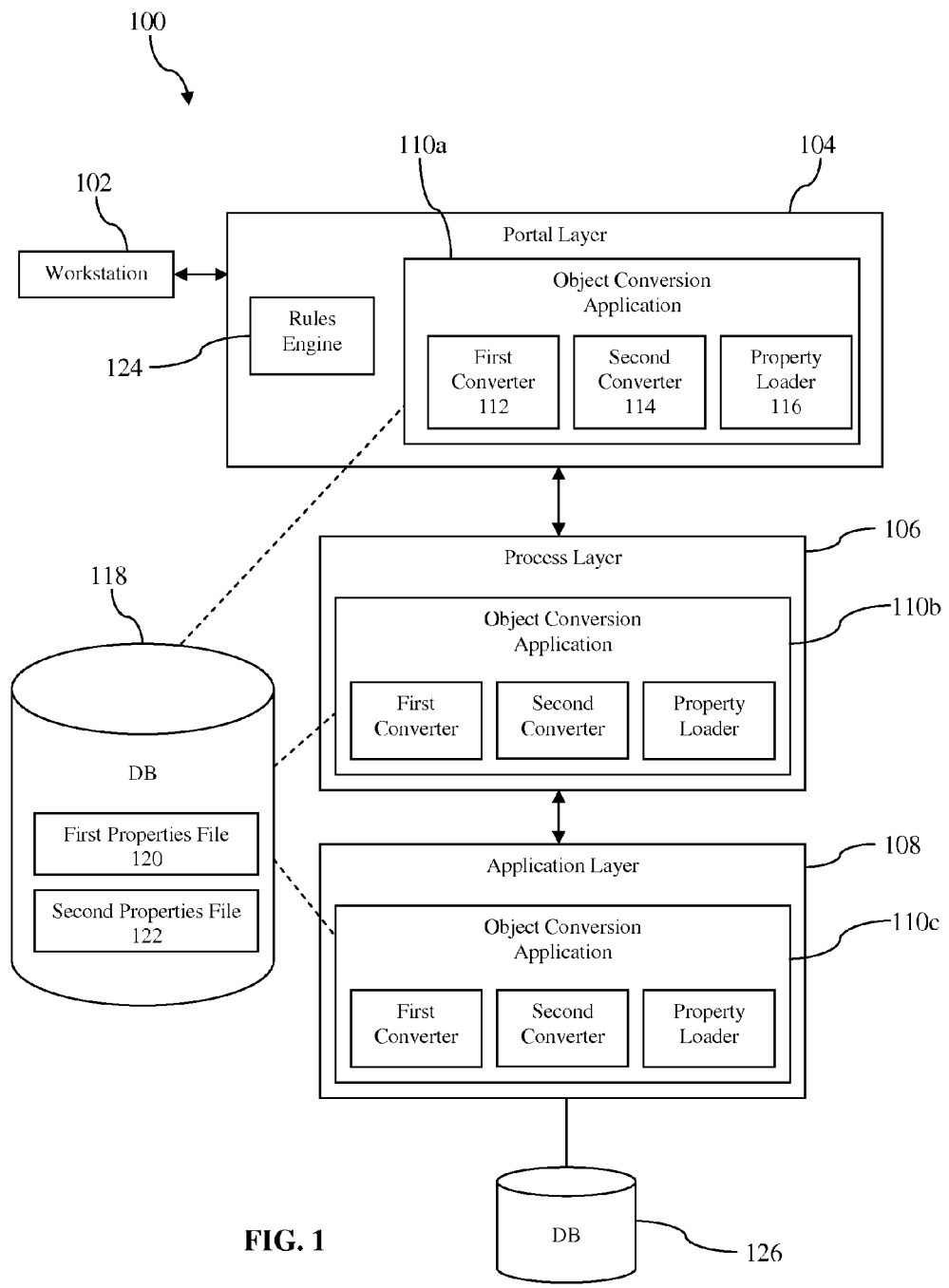
FIG. 1 is an illustration of a system according to an embodiment of the disclosure.

Turning now to FIG. 1, a system 100 is described. In an embodiment, the system 100 comprises a management information system, for example, a healthcare management information system. In some embodiments, the system 100 comprises a Medicaid management information system (MMIS), but in other embodiments, the system 100 may comprise another enterprise computing system and/or enterprise computing application. Those skilled in the art will readily appreciate that the system and method of converting between software objects constructed according to different software technologies taught by the present disclosure may be applied to a wide variety of computing applications.

In an embodiment, the system 100 comprises a workstation 102, a portal layer 104, a process layer 106, and an application layer 108. In other embodiments, however, the system 100 may comprise different and/or other elements. The workstation 102 may be provided by a computer. Computers are discussed in detail hereinafter. In an embodiment, the portal layer 104 may comprise a plurality of cooperating computer applications and/or computer programs provided to and/or installed on a portal server computer, the computer applications, and/or programs collaboratively providing the services of the portal layer 104. In an embodiment, the process layer 106 may comprise a plurality of cooperating computer applications and/or computer programs provided to and/or installed on a process server computer, the computer applications and/or programs collaboratively providing the services of the process layer 106. In an embodiment, the application layer 108 may comprise a plurality of cooperating computer applications and/or computer programs provided to and/or installed on an application server computer, the computer applications and/or programs collaboratively providing the services of the application layer 108. In another embodiment, however, one or more of the portal layer 104, the process layer 106, and the application layer 108 may be provided to and/or installed together on a computer. Any of the portal layer 104, the process layer 106, and the application layer 108 may be provided on a computer that has been provided with appropriately configured hardware and has had the subject computer readable program code installed and loaded. In an embodiment, one or more of the portal layer 104, the process layer 106, and the application layer 108 may execute on computers within an execution environment provided by Web Sphere server software or other server software. For example, in an embodiment, the portal layer 104 may execute on a computer in a Web Sphere portal server software execution environment, the process layer 106 may execute on a computer in a Web Sphere process server software execution environment, and/or the application layer 108 may execute on a computer in a Web Sphere application server software execution environment.

In an embodiment, the functionality provided by the system 100 may be structured across multiple layers—for example, across the portal layer 104, the process layer 106, and the application layer 108—to realize one or more architectural goals. For example, structuring the system 100 into a plurality of layers may promote removing or abstracting middleware programming model dependencies from business logic. As another example, structuring the system 100 into a plurality of layers may promote a model-view-controller solution, wherein the structure of underlying data may be maintained independently of a user interface so either the underlying structure of the data or methods of accessing the data can be changed without affecting the user interface view and so the user interface may be changed without affecting the structure of the data or the methods of accessing the data. Generally, structuring the system 100 into multiple layers may promote decoupling the layers from one another, allowing the different layers to support different abstractions.

The portal layer 104 provides an interface to external users, for example a user of the workstation 102. The process layer 106 encapsulates the orchestration of business processes exposed as services for users. The process layer 106 may interact with business abstractions referred to as business objects (BOs) that are implemented as service data objects (SDOs). The process layer 106 promotes the business processes of the system 100. Business processes form the building blocks in this layer to integrate activities, human tasks, disparate applications, and environments. Business process modeling binds together the individual services and components along with different activities in a logical sequence. The application layer 108 maps the business processes to interactions with data stored in databases, for example a second database 126. The application layer 108 may interact with data objects as Java bean objects, also known as plain old java objects (POJOs).

In an embodiment, the workstation 102 may communicate with the portal layer 104 via any data communication protocol, for example using hyper text transport protocol (HTTP) message exchanges. The communication link between the workstation 102 and the portal layer 104 may be provided by any of a combination of public switched telephone network (PSTN) communication links, public data network (PDN) communication links, and private network communication links. The workstation 102 may be employed by a user of the system 100 to initiate and complete transactions. For example, an internal user of a state Medicaid management information system, for example an administrative agency internal user, may use the workstation 102 to enter a claim for reimbursement for medical services on behalf of a healthcare provider or other member of the state Medicaid system. The workstation 102 may send a request message to the portal layer 104; the layers 104, 106, 108 may collaboratively service the request embodied in the request message; and the portal layer 104 may return a response message to the workstation 102 indicating the success or failure of the request. The communication links between the portal layer 104, the process layer 106, and the application layer 108 may also be provided by any combination of public and private network links.

Because the layers 104, 106, 108 may support different software technologies and/or different data models, in an embodiment, an object conversion functionality is provided. For example, if the process layer 106 desires to invoke a service provided by the application layer 108, the process layer 106 may convert a first object from a software technology or data model suitable to the process layer 106 to a second object according to a different software technology or data model that is suitable for the application layer 108 and then invoke the service provided by the application layer 108 by providing the second object in a method invocation. Providing a generic conversion functionality that may be used by a wide variety of objects may provide advantages, such as reducing a code footprint of the system 100, reducing the design and coding burden of programmers developing software components and/or software classes, reducing the burden of testing the system 100, and reducing the burden of maintaining the system 100.

The portal layer 104 comprises a first object conversion application 110a that provides services to convert a first object of a first class associated with a first software technology to a second object of a second class associated with a second software technology, wherein the first and second software technologies are different. The object conversion application 110a also provides services to convert a third object of a third class associated with the second software technology to a fourth object of a fourth class associated with the first software technology. In an embodiment, the first software technology may be a JAVA software technology. The first object may be a JavaBean type of object and may also be referred to as a plain old JAVA object (POJO). In an embodiment, the second software technology may be a SERVICE DATA OBJECT software technology. In other embodiments, the first software technology and the second software technology may be other different software technologies. The first object conversion application 110a comprises a first conversion module and/or component, a second conversion module and/or component, and a properties loader module and/or component referred to hereinafter, respectively, as a first converter 112, a second converter 114, and a properties loader 116.

The first converter 112 converts a first object of a first class constructed according to the first software technology to a second object of a second class constructed according to the second software technology. In an embodiment, the first converter 112 is provided the first object when it is invoked to perform conversion. The first converter 112 may analyze the first class of the first object to discover the attributes and methods of the first object. The first class is associated with the second class by an entry in a first properties file 120. In an embodiment, the first properties file 120 and a second properties file 122 are stored in a first database 118. In another embodiment, however, copies of the properties files 120, 122 may be stored in each of the portal layer 104, the process layer 106, and the application layer 108. The first converter 112 determines the second class by invoking a method on the properties loader 116 which mediates access to the first properties file 120.

The first converter 112 analyzes the definition of the second class to identify one or more attributes of the second class and one or more methods of the second class. Depending upon the software technology associated with the second class the activity of analyzing the definition of the second class may be referred to by different names. For example, if the second class is a JAVA class, the process of analyzing the definition of the second class may be referred to as introspection. Some classes may comprise attributes which are objects in their own right. In this case, the object attribute may correspondingly be analyzed to identify one or more attributes and one or more methods of the object attribute. The first converter 112 constructs the second object. The first converter 112 then invokes the methods of the second class to assign values to the attributes of the second object according to corresponding attributes of the first object, for example assigning the value of a social security number attribute of the second object based on the value of a social security number attribute of the first object.

It should be noted that, while the first class and the second class may be implemented with different software technologies, they are associated with each other by the first properties file 120 because they may be said to represent the same abstraction. For example, a patient demographics class associated with the first technology may comprise attributes that correspond to attributes of a patient demographics class associated with the second software technology. For example, both the first and the second classes may contain a patient name attribute, a patient social security number attribute, a patient address attribute, a patient age attribute, and a patient sex attribute. In an embodiment, corresponding attributes of the first class and the second class may be automatically associated with each other by the first converter 112 by the use of a naming convention that names similar attributes with similar names, such that the first converter 112 can automatically associate the corresponding attributes of the first and second classes. In another embodiment, however, a different mechanism may be employed for associating corresponding attributes of associated classes of different software technologies. The first converter 112 then returns the second object which may be said to be a conversion of the first object.

Provided the association between the classes of the two different software technologies is defined in the first properties file 120, the first converter 112 converts between any object of any class constructed according to the first software technology to an object of the corresponding class constructed according to the second software technology. As the system 100 evolves over time, for example, as the enterprise application embodied by the layers 104, 106, 108 is refined and extended, new classes may be implemented. As new classes are implemented, conversions among objects of these new classes is readily supported—without modifying the first converter 112, the second converter 114, or the property loader 116—by adding appropriate definitions of associations in the first properties file 120.

The code footprint for object conversion in the system 100, based on the object conversion application 110 and associated properties files 120, 122 described above, may be substantially smaller than the code footprint that would be associated with writing one-off code implementations for each pair of associated classes. In a large enterprise application, such as is contemplated as an embodiment of the system 100, there may be hundreds of class pairs. The code footprint for implementing a bidirectional conversion (e.g., as provided by the first converter 112 and the second converter 114) between each of the members of the hundreds of class pairs would likely be very large. The reduced code footprint associated with the present disclosure may make the object conversion application 110 easier to test and easier to maintain going forwards.

The second converter 114 converts a third object of a third class constructed according to the second software technology to a fourth object of a fourth class constructed according to the first software technology. The third class is associated with the fourth class by an entry in the second properties file 122 stored in the first database 118 or stored in one or more of the portal layer 104, the process layer 106, and the application layer 108. The second converter 114 operates according to principles similar to those of the first converter 112. Provided the association between the classes of the two different software technologies is defined in the second properties file 122, the second converter 114 will convert between any object of any class constructed according to the second software technology to an object of the corresponding class constructed according to the first software technology. The first converter 112 and the second converter 114 provide for bidirectional conversion of objects between the first and the second software technologies.

The second converter 114 may be provided the third object when it is invoked to perform conversion. The second converter 114 may analyze the third class of the third object to discover the attributes and methods of the third object. The third class is associated with the fourth class by an entry in the second properties file 122. The second converter 114 determines the fourth class by invoking a method on the properties loader 116 which mediates access to the second properties file 122.

The second converter 114 analyzes the definition of the fourth class to identify one or more attributes of the fourth class and one or more methods of the fourth class. In the case that the fourth class comprises object attributes, the object attribute may correspondingly be analyzed to identify one or more attributes and one or more methods of the object attribute. The second converter 114 constructs the fourth object. The second converter 114 then invokes the methods of the fourth class to assign values to the attributes of the fourth object according to corresponding attributes of the third object. As above, corresponding attributes of the third class and the fourth class may be automatically associated with each other by the second converter 114 by the use of a naming convention that names similar attributes with similar names, such that the second converter 114 can automatically associate the corresponding attributes of the third and fourth classes. In another embodiment, however, a different mechanism for associating corresponding attributes between corresponding objects of the different software technologies may be employed. The second converter 114 then returns the fourth object which may be said to be a conversion of the third object.

In an embodiment, the first converter 112, the second converter 114, and the property loader 116 may be stateless and may be implemented preferably as singletons. As is known to those of ordinary skill in the art, a singleton class enforces the constraint that only one object of the class may be constructed in one execution environment. This may be promoted by observing the convention that the singleton object is accessed by calling a static method and/or a class method on the singleton class to access the singleton object. The static/class method returns a reference or a pointer to the singleton object. The singleton implementation of the first converter 112, the second converter 114, and the property loader 116 may provide advantages of reduced processing overhead, since the singleton object does not need to be constructed and created every time the singleton object is accessed but only a first time. In some embodiments, however, the first converter 112, the second converter 114, and the property loader 116 may not be implemented as singletons, and the teachings of the present disclosure are not limited solely to singleton-based implementations.

In an embodiment, each of the layers 104, 106, 108 of the system 100 comprises an object conversion application 110. For example, the process layer 106 may comprise a second object conversion application 110*b*, and the application layer 108 may comprise a third object conversion application 110*c*. The second object conversion application 110*b* and the third object conversion application 110*c* are substantially similar to the first object conversion application 110*a* and operate according to similar principles. In an embodiment, the second object conversion application 110*b* and the third object conversion application 110*c* access the same properties files 120, 122 that the first object conversion application 110*a* accesses. Alternatively, in another embodiment, the properties files 120, 122 may be duplicated as local copies and/or files at each of the layers 104, 106, 108.

In an embodiment, the portal layer 104 and the application layer 108 provide services for objects of a first software technology, for example POJO objects, while the process layer 106 provides services for objects of a second software technology, for example Service Data Objects (SDOs). Consequently, in an embodiment, to process a service request that relies upon interaction among the layers 104, 106, 108, conversions between objects of different software technologies is needed.

An exemplary use scenario of the system 100 is now described. An internal user of the system 100 enters a transaction to update demographic information for a member, for example a patient in a state MMIS. The information may be entered into a field of a screen provided as a graphical user interface provided by the portal layer 104, for example a web page accessed via a web browser of the workstation 102. The information may be provided as a parameter value in a request message. The workstation 102 transmits the request message to the portal layer 104 containing the changed demographic information. The portal layer 104 constructs an object according to the first software technology and populates the object with the appropriate demographic information. Some of the demographic information may be populated from some source other than from the workstation 102, for example from the second database 126 via an access to the application layer 108. In an embodiment, the portal layer 104 may transmit the object to the process layer 106 for processing, for example for validating the changed demographic information. The portal layer 104 may invoke the first converter 112 of the first object conversion application 110*a* to convert the first object of the first software technology to a second object of the second software technology.

The portal layer 104 may pass the second object via a request message to the process layer 106. The process layer 106 may process the second object by executing one or more business rules to validate the second object. If the information provided by the internal user to the graphical user interface screen is in error, for example if a patient age of 520 was entered instead of the intended 52, validation of the second object before writing this update to the second database 126 may detect and request correction of the error by the internal user. In some contexts, the second object may be referred to as a business object (BO). The process layer 106 may invoke the second converter 114 of the second object conversion application 110b to convert the second object to a third object of the first software technology. The process layer 106 may pass the third object via a request message to the application layer 108. The application layer 108 may write at least some of the information contained in the third object to the second database 126, for example the changed demographic information entered by the internal user at the workstation 102. In some contexts, the third object may be referred to as a domain object.

The application layer 108 may create a fourth object of the first software technology that represents the result of the demographics update request. The application layer 108 may invoke the first converter 112 of the third object conversion application 110c to convert the fourth object to a fifth object of the second software technology. The application layer 108 may pass the fifth object to the process layer 106. The process layer 106 may invoke the second converter 114 of the second object conversion application 110b to convert the fifth object to a sixth object of the first software technology. The process layer 106 may pass the sixth object to the portal layer 104. The portal layer 104 may process the sixth object to extract a result of the request message received from the workstation 102. The portal layer 104 may build a result message based on the extracted result and transmit the result message to the workstation 102. The workstation 102 may display the result to the internal user of the system 100 on a display of the workstation 102.

Figure 2:
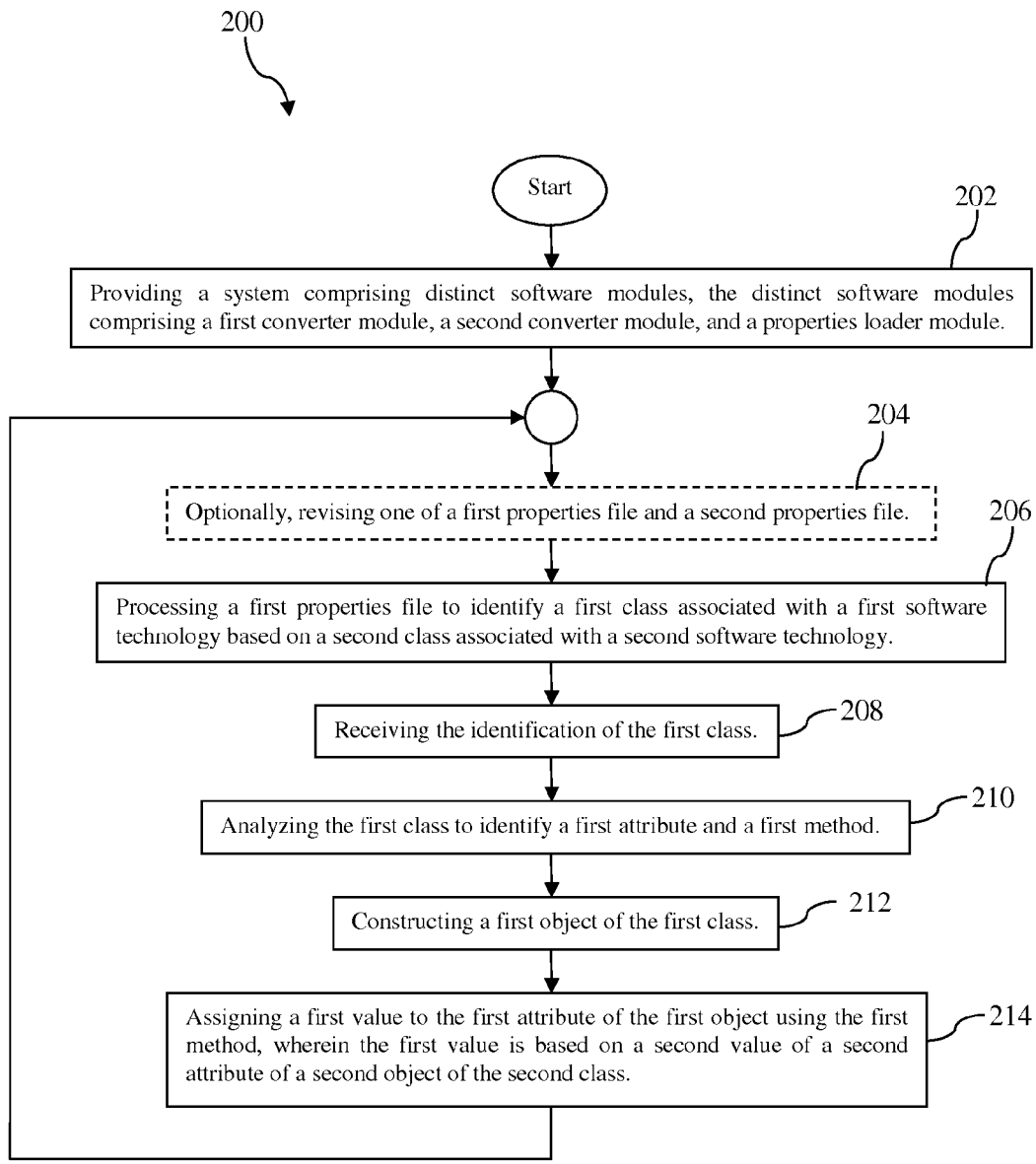
FIG. 2 is a flow chart of a method according to an embodiment of the disclosure.

Turning now to FIG. 2, a method 200 is described. At block 202, a system comprising distinct software modules is provided. The software modules may comprise the first converter 112, the second converter 114, and the property loader 116. The system may further comprise the first properties file 120 and the second properties file 122. The system may further comprise one or more of additional modules that comprise one or more of the portal layer 104, the process layer 106, and the application layer 108. The system may be provided as a computer program product comprising a computer usable medium having a computer readable program code embodied therein, the computer readable program code being adapted to be executed to implement a method for converting between data objects constructed according to different software technologies.

At block 204, at least one of the first properties file 120 and the second properties file 122 is optionally revised. For example, both the first properties file 120 and the second properties file 122 may be revised to define an additional association between a new class of a first software technology and a new class of a second software technology.

At block 206, the first properties file 120 is processed to identify a first class associated with the first software technology based on a second class associated with the second software technology. In an embodiment, the property loader 116 may perform this processing in response to being called by the first converter 112. At block 208, the identification of the first class is received, for example by the first converter 112. At block 210, the first converter 112 analyzes the first class to identify a first attribute and a first method. At block 212, the first converter 112 constructs a first object of the first class. At block 214, the first converter 112 assigns a first value to the first attribute of the first object using the first method, wherein the first value is based on a second attribute of a second object of the second class. The processing returns to block 204. The loop through blocks 204, 206, 208, 210, 212, and 214 suggests the repeated accessing of the first converter 112 during ongoing processing.

Figure 3:
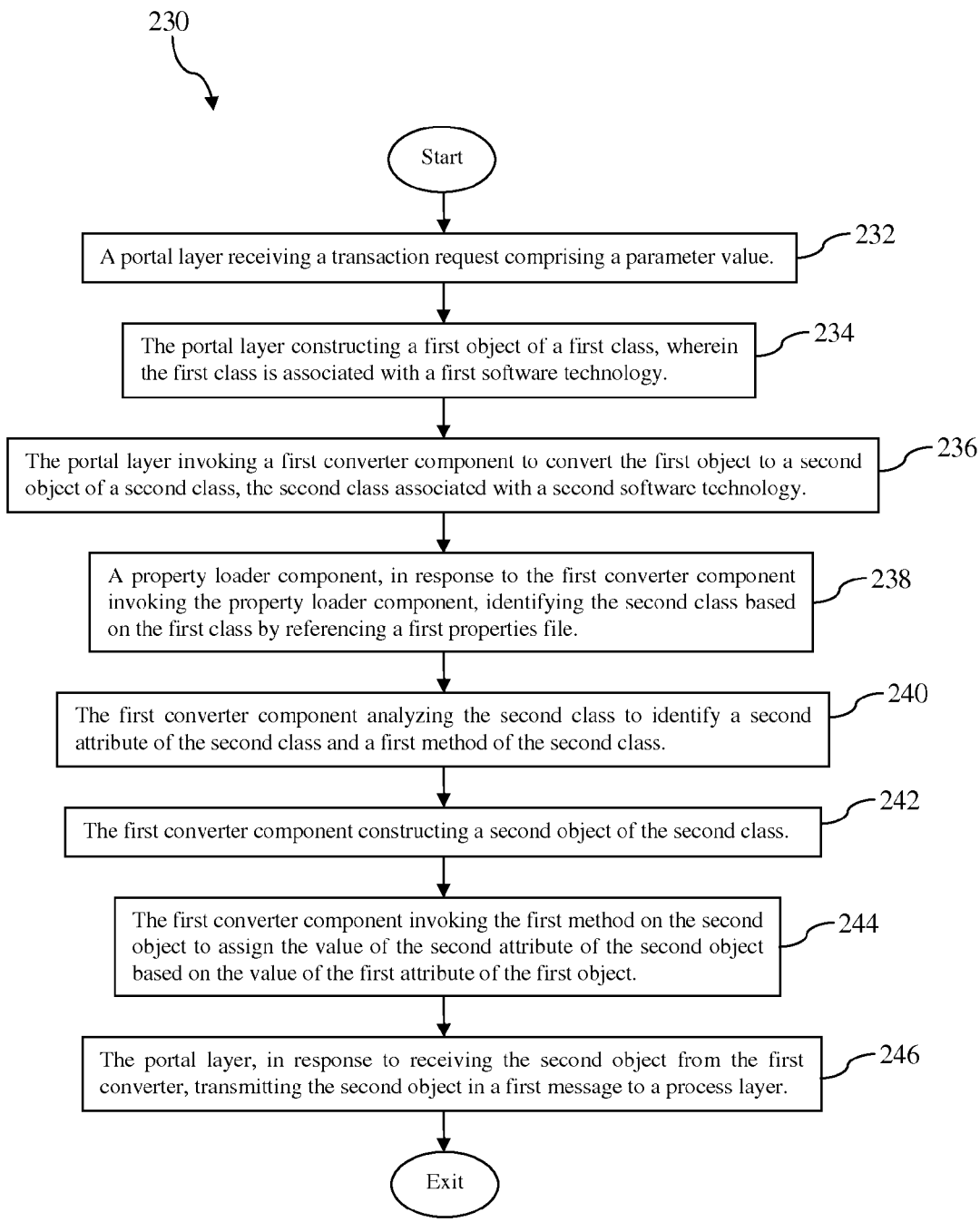
FIG. 3 is a flow chart of another method according to an embodiment of the disclosure.

Turning now to FIG. 3, a method 230 is described. At block 232, the portal layer 104 receives a transaction request comprising a parameter value, for example a request from the workstation 102 including data. At block 234, the portal layer 104 constructs a first object of a first class, the first class associated with a first software technology. The value of the parameter received in the transaction request may be assigned to an attribute of the first object. At block 236, the portal layer 104 invokes the first converter 112 to convert the first object to a second object of a second class, the second class associated with a second software technology.

At block 238, the property loader 116, invoked by the first converter 112, identifies the second class based on the first class by referencing the first properties file 120. At block 240, the first converter 112 analyzes the second class to identify a second attribute of the second class and a first method of the second class. At block 242, the first converter 112 constructs a second object of the second class. At block 244, the first converter 112 invokes the first method on the second object to assign a value to the second attribute of the second object based on the value of the first attribute of the first object. At block 246, the portal layer 104, in response to receiving the second object from the first converter, transmits the second object in a first message to the process layer 106 for further processing.

The methods 200 and 230, described above with reference to FIG. 2 and FIG. 3, respectively, describe a conversion of an object constructed according to a software technology to another object constructed according to a different software technology. In both methods 200 and 230, the description was based on using the first converter 112 to perform the object conversion. The methods 200 and 230 can readily be reconstructed to apply to the reverse object conversion, for example using the second converter 114. It is understood that the object conversion application 110, described above with reference to FIG. 1, promotes bidirectional conversion of objects among the several software technologies employed within the system 100. Exemplary pseudocode and flow charts that may provide some of the functionality of the converters 112, 114 are provided below.

An exemplary pseudocode description of a portion of the first converter 112, specifically a POJO to SDO converter, is provided below. POJO stands for a plain old JAVA object. BO stands for business object. SDO stands for service data object.

```
If POJO datatype is hibernate proxy then{
    get the pojo name from the proxy name
}
Get the BO name for the corresponding POJO name
Get the BO namespace for the BO Name
Create the BO
Get the SDO properties
Get the POJO methods
for 1..all methods of POJO {
  Get POJO method signature
  Store the signature in a map for a later use with method name as key
}
for1..all properties of SDO{
  Get the method name for the property using java bean spec
  if(BO property is a listed value) then{
    if (property type is business object type) then {
      Get the POJO list for the property
      if(POJO list is a hibernate proxy) then {
        if (proxy list is initialized) then {
          //Covert pojo list to SDO list
          if(pojo list type is a list)then{
```

-continued

```
        for each element of list{
            convert the POJO to SDO//recursive call
            Add the SDO to SDO list
        }
    }else (pojo list is a set)then{
        for each element of the set{
            Convert the POJO to SDO
            Add the SDO to the list
        }
    }
    Add the SDO list to the main SDO object
    }
    }
}else{
    if (property is a business object)then{
        Convert BO to POJO//recursive call
        Add the POJO to the main pojo
    }else{
        //Convert Java primitive to SDO primitive
        if(property type is string)then{
            Convert POJO attribute to string
            Add the string to BO
        }else if(property type is integer)then{
            Convert pojo attribute to Integer
            Add the integer to BO
        }else if(property type is long)then {
            Convert pojo attribute to long
            Add the long to BO
        }else if(property type is float)then {
            Convert POJO attribute to float
            Add the float to BO
        }else if(property type is double)then{
            Convert the pojo attribute to double
            Add the double to BO
        }else if(property type is short) then {
            Convert the pojo attribute to short
            Add the short to BO
        }else if(property type is boolean) then {
            Convert the pojo attribute to boolean
            Add boolean to BO
        }else if(property type is date) then {
            Convert the pojo attribute to Date
            Add the date to BO
        }else if(property type is byte) then {
            Convert the pojo attribute to byte
            Add the byte to BO
        }
    }
    }
}
}
```

Figure 4:
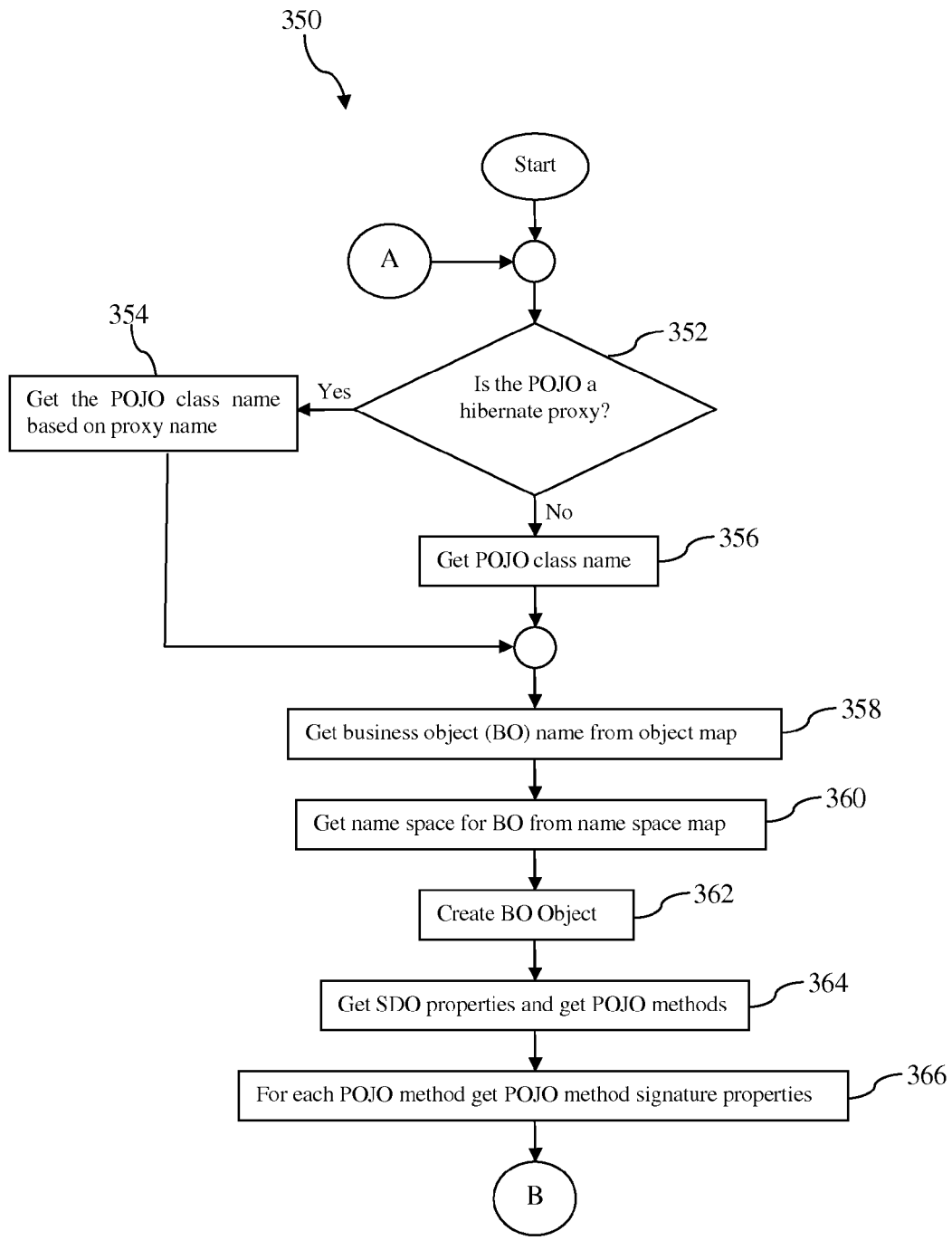
FIG. 4 is a flow chart of another method according to an embodiment of the disclosure.

Portions of the exemplary pseudocode description above are presented in FIG. 4, FIG. 5, FIG. 6, and FIG. 7. Turning now to FIG. 4, a method 350 for converting from a POJO to SDO is described. At block 352, if the POJO is a hibernate proxy, the process proceeds to block 354. At block 354, the POJO class name is obtained based on the proxy name. The processing proceeds to block 358. At block 352, if the POJO is not a hibernate proxy, the process proceeds to block 356. At block 356, the POJO class name is obtained.

At block 358, the business object name associated with the POJO class name is obtained from the object map. At block 360, the name space for the business object name is obtained from a name space map. At block 362, the business object is created. At block 364, the SDO properties of the business object associated with the POJO are obtained and the methods of the POJO are obtained. At block 366, for each POJO method the corresponding POJO method signatures are obtained.

Figure 5:
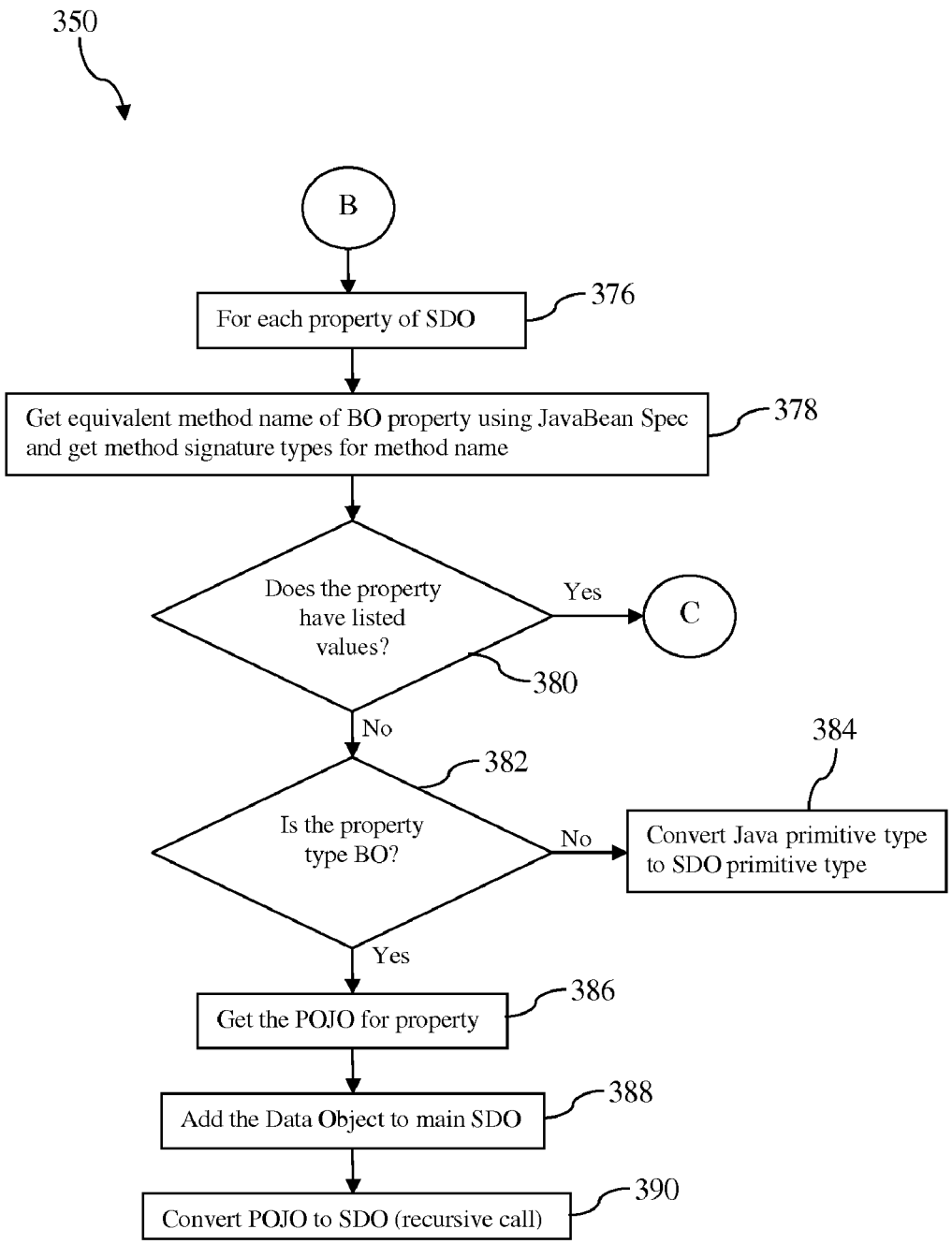
FIG. 5 is a flow chart of another method according to an embodiment of the disclosure.

Turning now to FIG. 5, the description of the method 350 continues. At block 376, each property of the SDO is processed. This step implies iterative processing. At block 378, an equivalent method name of the business object property is obtained using the JavaBean specification of the POJO and the method signature is obtained. At block 380, if the property is listed values the process proceeds to further processing at block 400 as described with reference to FIG. 6. If the property is not listed values, the processing proceeds to block 382.

At block 382, if the property type is not a business object, the processing proceeds to block 384. At block 384, the JAVA primitive type is converted to the SDO primitive type. At block 382, if the property type is a business object, the processing proceeds to block 386. At block 386, the POJO is obtained for the property. At block 388, the data object is added to the main SDO. At block 390, the POJO is converted to SDO, which is a recursive call to the method 350.

Figure 6:
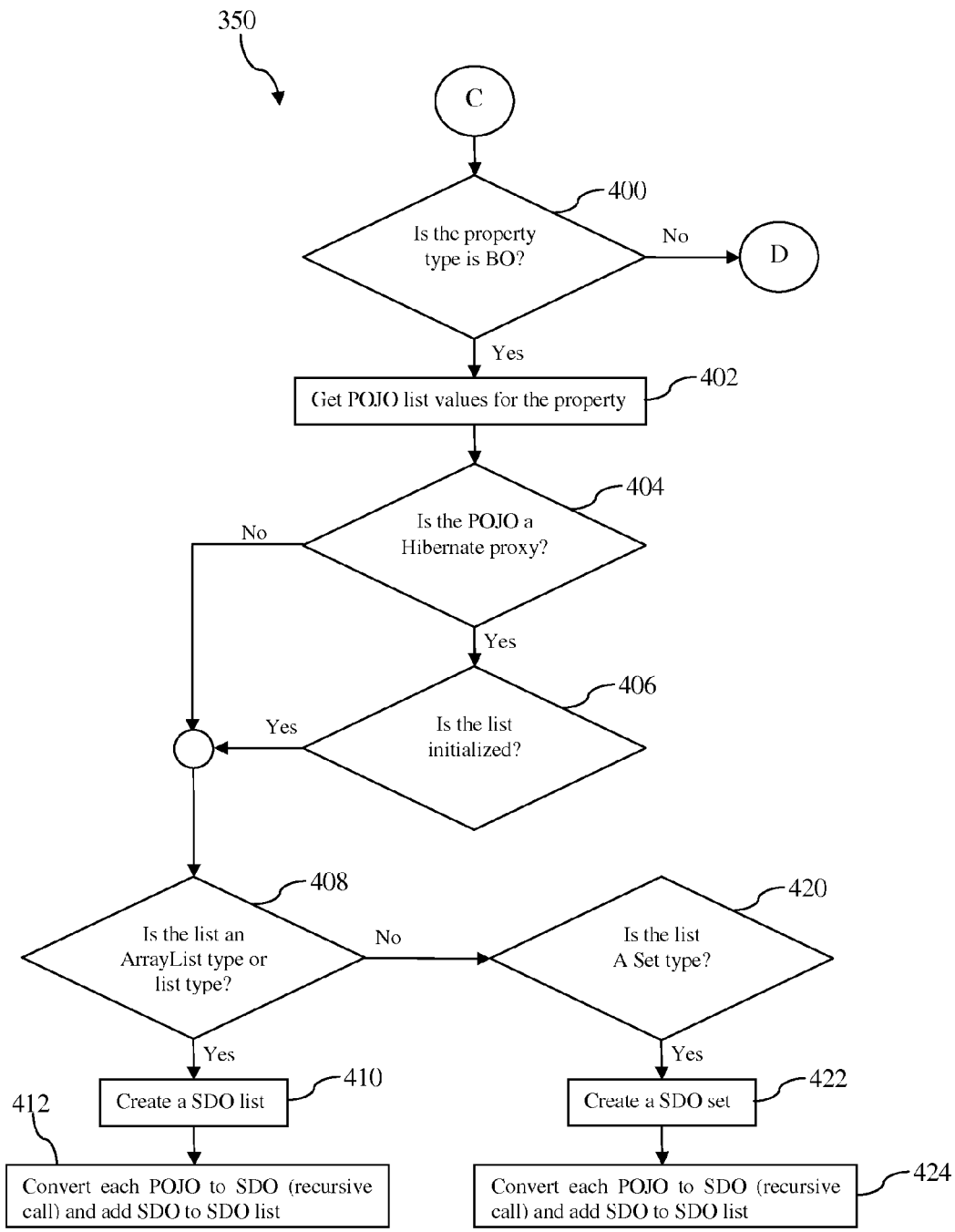
FIG. 6 is a flow chart of another method according to an embodiment of the disclosure.

Turning now to FIG. 6, the description of the method 350 continues. At block 400, if the property type is not a business object, the processing proceeds to block 430 which is described with reference to FIG. 7 below. At block 400, if the property type is a business object, the processing proceeds to block 402. At block 402, the POJO list values for the property are obtained. At block 404, if the POJO is hibernate proxy, the process proceeds to block 406. At block 406, if the list is initialized the process proceeds to block 408. At block 404, if the POJO is not hibernate proxy, the process proceeds to block 408.

At block 408, if the list of ArrayList type or List type, the processing proceeds to block 410. At block 410, an SDO list is created. At block 412, each POJO is converted to SDO, a recursive call to the method 350. The SDO is added to the SDO list. At block 408, if the list is not of ArrayList type or List type, the processing proceeds to block 420. At block 420, if the list is set type, the processing proceeds to block 422. At block 422, a SDO set is created. At block 424, each POJO is converted to SDO, a recursive call to the method 350. The SDO is added to the SDO list.

Figure 7:
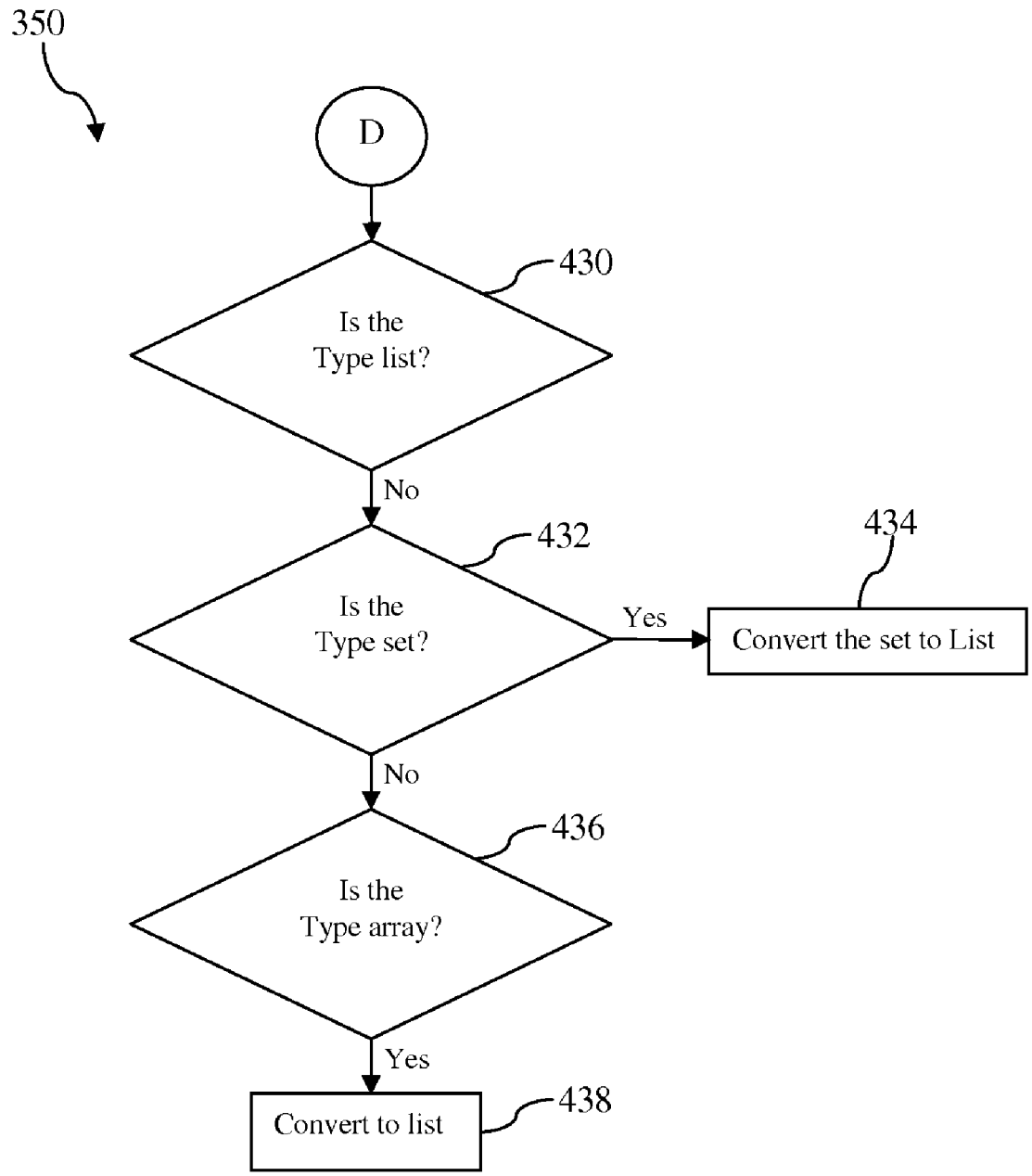
FIG. 7 is a flow chart of another method according to an embodiment of the disclosure.

Turning to FIG. 7, the description of method 350 continues. At block 430, if the type is not list type the processing proceeds to block 432. At block 432, if the type is set type, the process proceeds to block 434 where the set is converted to list. At block 436, if the type is array type, the process proceeds to block 438 where the array is converted to list.

An exemplary pseudocode description of a portion of the second converter 114, specifically an SDO to POJO converter, is provided below.

```
Get the POJO type for the given BO
Create the POJO
Get the POJO methods
for 1..all methods of POJO{
    Get the pojo method signature for later use
}
Get all the properties of SDO
for each property of SDO{
    Get the equivalent pojo method signature using Java bean spec
    if(SDO property type is list type)then{
        if(property type is a SDO object)then{
            Get the SDO list properties
            if(list is not empty)then{
                //Convert the BO list to POJO list
                for all elements in BO list
                convert the BO to POJO//recursive call
                Add pojo to pojo list
            }
            Add the pojo list to POJO main
        }
    }else if(property type is SDO)then{
        Covert the BO to POJO//recursive call
        Add the pojo to main pojo
    }else{
        //convert SDO property to POJO
```

```
        if(property type is String)then{
            get BO property as String
            Add String to POJO
        }else if(Property type is float)then{
            Get BO property as float
            Add float to the pojo
        }else if(Property type is Integer)then{
            Get BO property as integer
            Add integer to the pojo
        }else if(Property type is DOUBLE)then {
            Get BO property as double
            Add double to POJO
        }else if(Property type is bigdecimal)then {
            Get BO property as big decimal
            Add big decimal to pojo
        }else if(Property type is boolean)then{
            Get BO property as boolean
            add boolean to pojo
        }else if(Property type is long) then {
            get BO property as long
            Add long to POJO
        }else if(Property type is date)then{
            get BO property as date
            Add date to pojo
        }
    }
}
```

Figure 8:
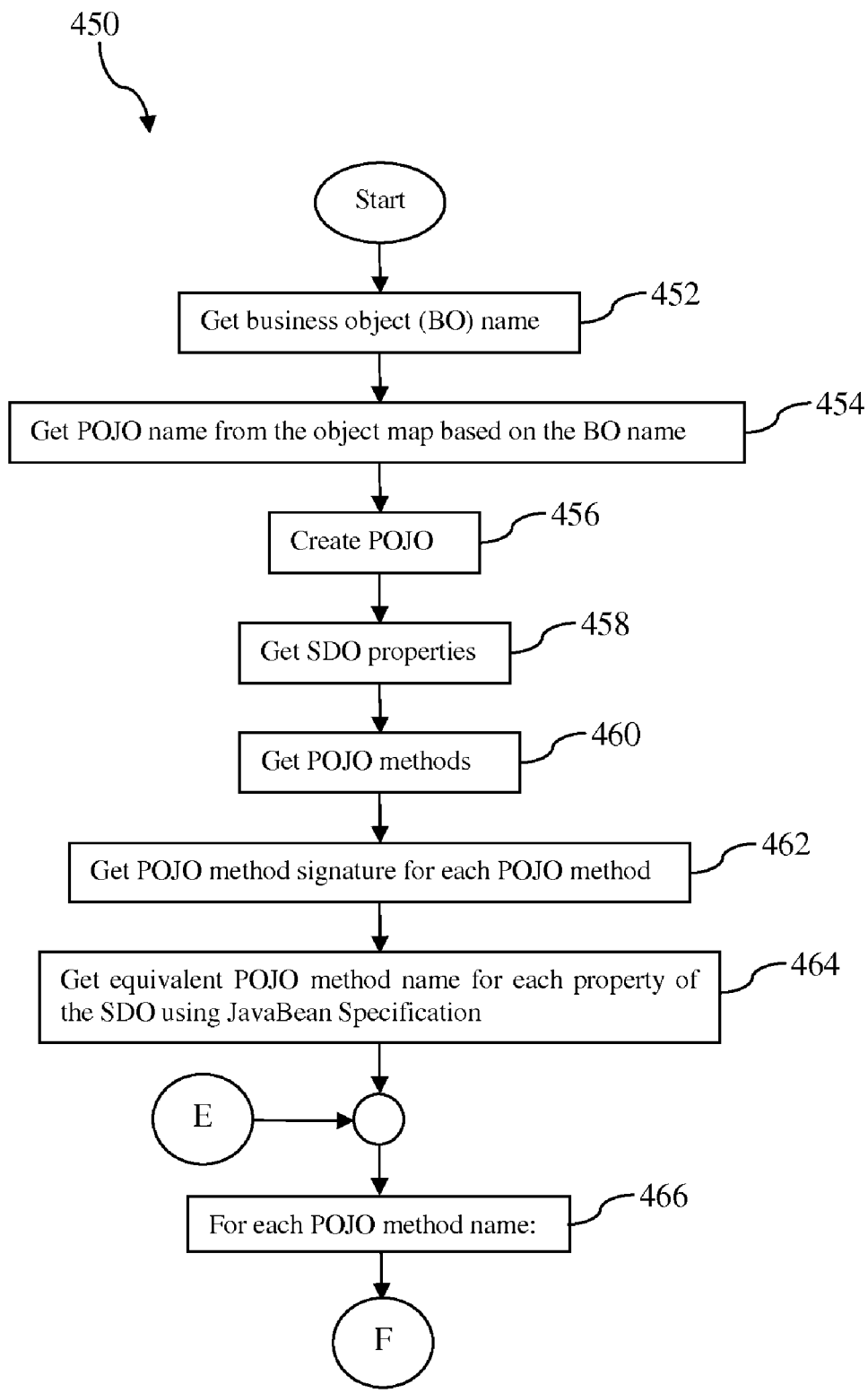
FIG. 8 is a flow chart of another method according to an embodiment of the disclosure.

Portions of the exemplary pseudocode description above are presented in FIG. 8, FIG. 9, FIG. 10, and FIG. 11. Turning now to FIG. 8, a method 450 for converting from an SDO to a POJO is described. At block 452 a BO name is obtained, for example by looking up a business object name associated with the SDO that is to be converted to a POJO. At block 454, the POJO name associated with the business object is looked up in an object map. At block 456, the POJO is created, for example the POJO is instantiated. At block 458, the properties of the SDO are obtained. At block 460, the methods of the POJO are obtained. At block 462, the method signatures, for example the argument names and associated argument types, for each POJO method are obtained. The processing represented by block 462 may be implemented as iterative processing. At block 464 an equivalent POJO method name is obtained for each property of the SDO using the JavaBean specification associated with the POJO. At block 466, for each POJO method name, further processing is performed in block 476 described with reference to FIG. 9 below. This activity may be performed in an iterative fashion.

Figure 9:
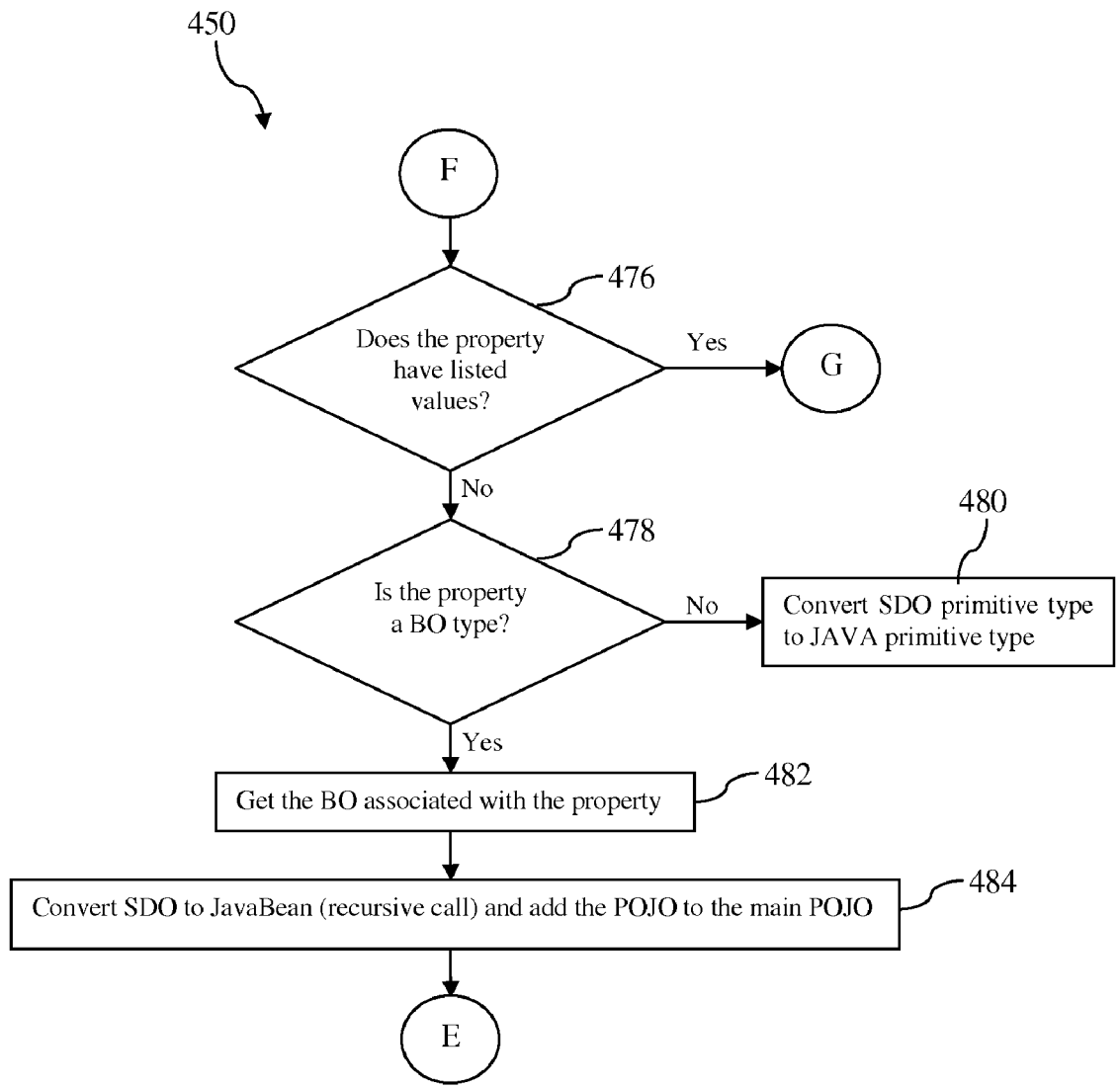
FIG. 9 is a flow chart of another method according to an embodiment of the disclosure.

Turning now to FIG. 9, the further processing according to method 450 is described. At block 476, if the currently considered property of the SDO (the one associated with the currently considered POJO method) has listed values, the property is further processed as a list at block 490 as described with reference to FIG. 10 below. If the currently considered property of the SDO is not listed values, the method 450 proceeds to block 478 where if the property is a business object type, the method 450 proceeds to block 482. At block 482, the business object associated with the property is obtained. At block 484, the SDO is converted to a POJO and/or JavaBean. This block represents a recursive call to the method 450. After the recursive call to the method 450 for this subject object returns, the POJO is added to the main list of POJOs. In block 478, if the property is not a business object type, the method 450 proceeds to block 480. At block 480, the SDO primitive is converted to the corresponding JAVA primitive type. After the processing of FIG. 9 completes, the processing may be considered to return to block 466 where the next POJO method name is processed. When all POJO method names have been processed, the method 450 exits.

Figure 10:
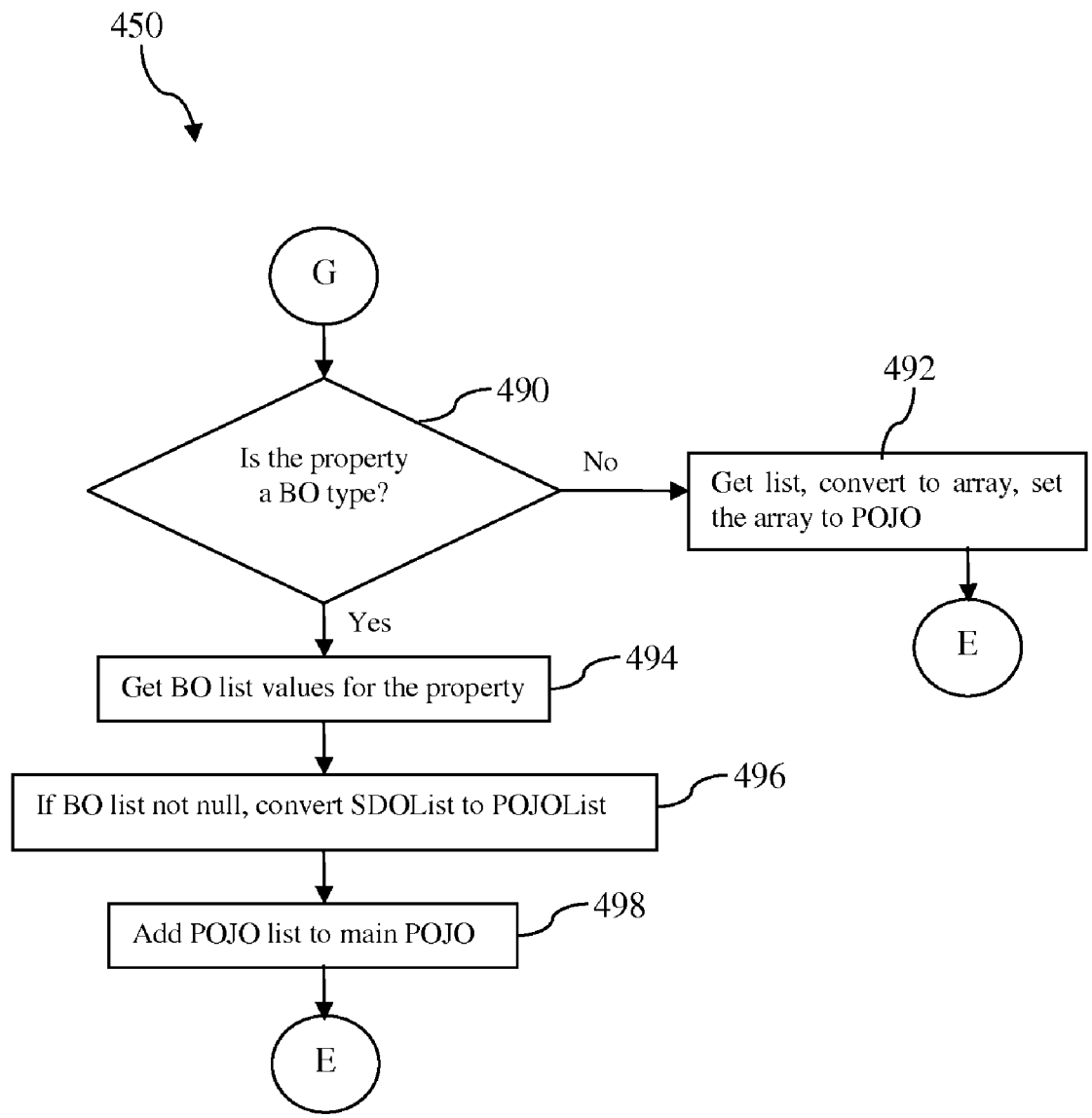
FIG. 10 is a flow chart of another method according to an embodiment of the disclosure.

Turning now to FIG. 10, the processing of the property of the SDO when it is a listed value is described. At block 490, if the property is not a business object type, the processing proceeds to block 492 where the list is obtained, the list is converted to an array, and the array is set to POJO. After block 492, the process returns to block 466 on FIG. 8. When all POJO methods have been processed, the method 450 exits.

At block 490, if the property is a business object type, the processing proceeds to block 494 where the business object list values for the property are obtained. At block 496, if the business object list is not null, the SDOList is converted to a POJOList by executing a method 510 described below in reference to FIG. 11. At block 498, the POJOList is added to the list of POJO. After block 498, the process returns to block 466 on FIG. 8. When all POJO methods have been processed, the method 450 exits.

Figure 11:
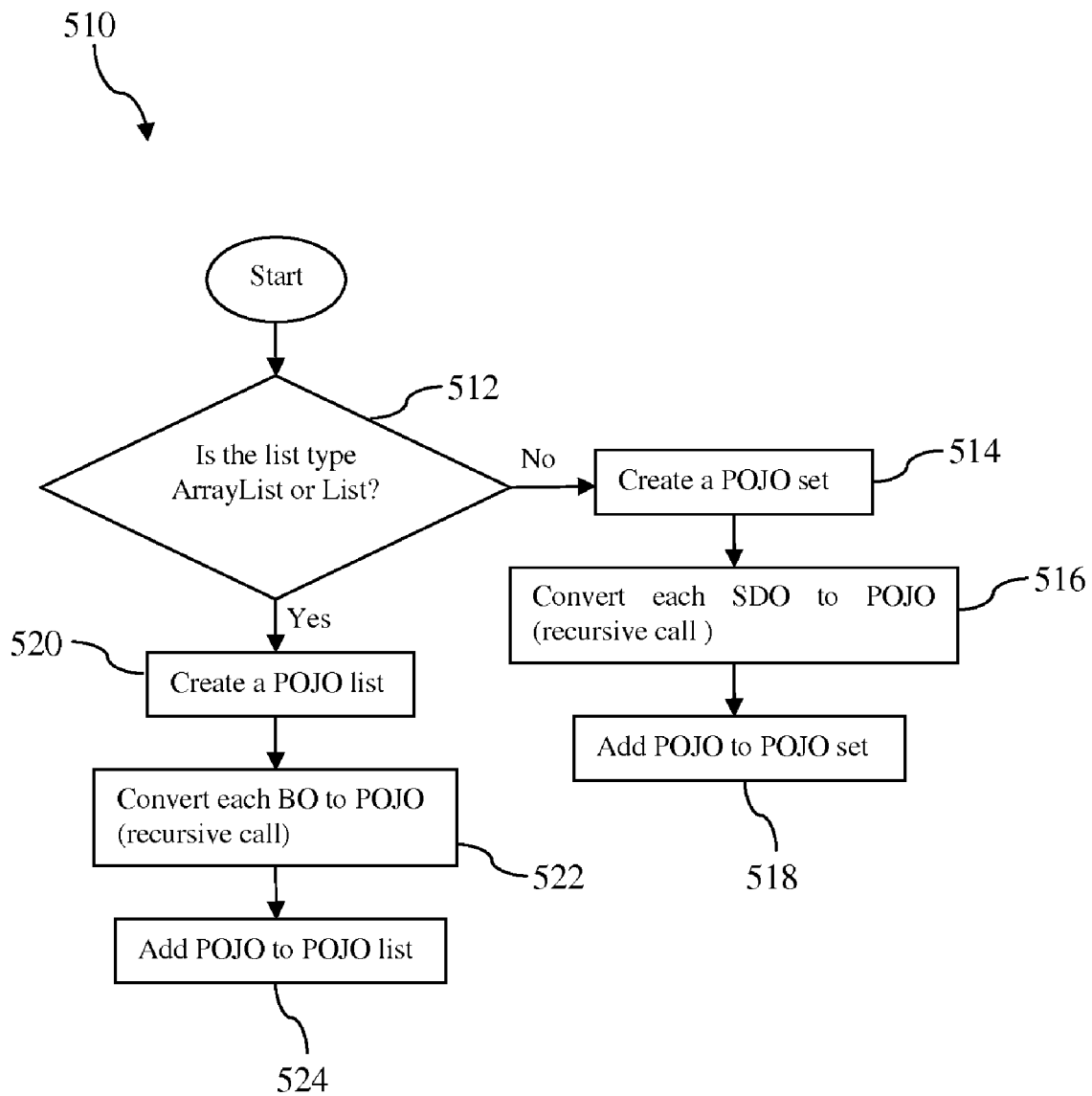
FIG. 11 is a flow chart of another method according to an embodiment of the disclosure.

Turning now to FIG. 11, the method 510 is described. At block 512 if the list is not of type ArrayList type or List type, the processing proceeds to block 514. At block 514, a POJO set is created. At block 516, each SDO is converted to a POJO, which is a recursive call to method 250. After the recursive call returns, the POJO is added to the POJO set at block 518. At block 512, if the list is type ArrayList type or List type, the processing proceeds to block 520. At block 520, a POJO list is created. At block 522, each business object is converted to a POJO object, which is a recursive call to method 250. When the recursive call returns, the POJO is added to the POJO list at block 524.

Those of ordinary skill in the art, in combinations with the teachings of this disclosure, would be able to adapt the above pseudocode to provide the converters 112, 114 described above. Additionally, those skilled in the art, in combination with the teachings of this disclosure, will appreciate that the objects that are converted may be any kinds of objects and may comprise objects that represent real-world entities, for example, anti-lock braking control objects, anti-lock braking feedback objects, engine throttle control objects, engine parameter feedback objects, chemical plant process control objects, chemical plant process feedback objects, and the like.

Figure 12:
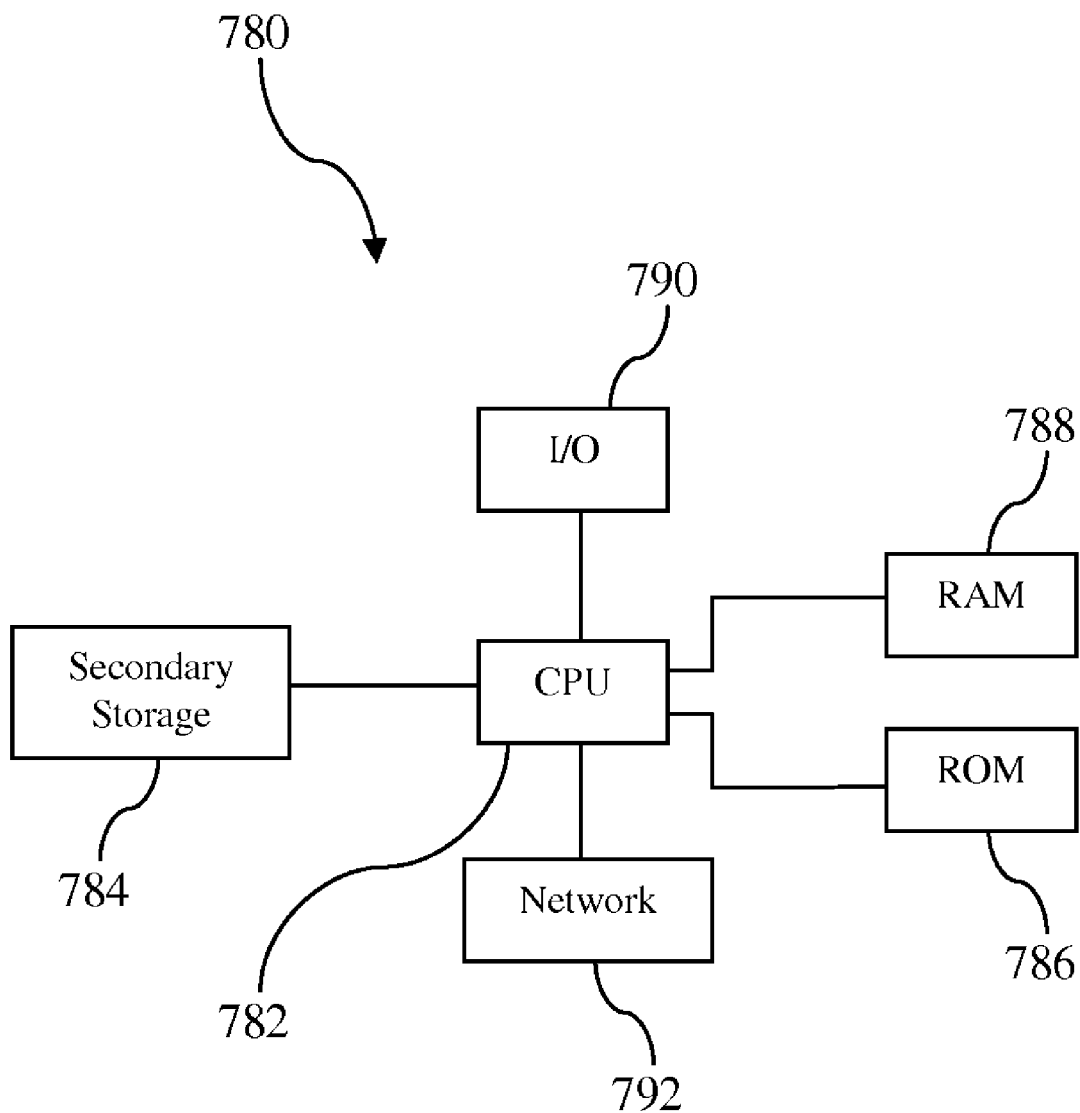
FIG. 12 is an illustration of an exemplary computer system suitable for implementing some aspects of the several embodiments of the disclosure.

Some aspects of the system 100 described above may be implemented on a computer and/or computer system with sufficient processing power, memory resources, and network throughput capability to handle the necessary workload placed upon it. FIG. 12 illustrates a computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer program product, comprising a non-transitory computer usable medium having a computer readable program code embodied therein, the non-transitory computer readable program code adapted to be executed to implement a method for converting between data objects constructed according to different software technologies, the method comprising:

providing a system, wherein the system comprises distinct software modules, and wherein the distinct software modules comprise a first converter module, a second converter module, and a properties loader module;

processing a first properties file to identify a first class associated with a first software technology based on a second class associated with a second software technology, wherein processing the first properties file is performed by the properties loader module in response to being called by the first converter module;

receiving, by the first converter module, the identification of the first class from the properties loader module;

analyzing, by the first converter module, the first class to identify a first attribute and a first method;

constructing, by the first converter module, a first object of the first class;

assigning, by the first converter module, a first value to the first attribute of the first object using the first method, wherein the first value is based on a second value of a second attribute of a second object of the second class;

processing a second properties file to identify a third class associated with the second software technology based on a fourth class associated with the first software technology, wherein the processing the second properties file is performed by the properties loader module in response to being called by the second converter module;

receiving, by the second converter module, the identification of the third class from the properties loader module;

analyzing, by the second converter module the third class to identify a third attribute and a second method;

constructing, by the second converter module, a third object of the third class; and assigning by the second converter module, a third value to the third attribute of the third object using the second method, wherein the third value is based on a fourth value of a fourth attribute of a fourth object of the fourth class.

2. The computer program product of claim 1, wherein the first converter module, the second converter module, and the properties loader module are provided as singletons.

3. The computer program product of claim 1, wherein the non-transitory computer readable program code is further adapted to be executed to implement a healthcare management information system.

4. The computer program product of claim 3, wherein the first software technology is used by a portal layer and an application layer of the healthcare management information system and the second software technology is used by a process layer of the healthcare management information system.

5. The computer program product of claim 1, wherein the second object comprises a plurality of attributes that are objects.

6. A computer implemented method of processing a healthcare management information system transaction, comprising:

receiving a transaction request comprising a parameter value;

constructing a first object of a first class, wherein the first class is associated with a first software technology;

assigning the parameter value to a first attribute of the first object;

identifying a second class based on the first class by referencing a first properties file, wherein the second class is associated with a second software technology;

analyzing the second class to identify a second attribute of the second class and a first method of the second class;

constructing a second object of the second class;

invoking the first method on the second object to assign the value of the second attribute of the second object based on the value of the first attribute of the first object;

transmitting the second object in a first message;

receiving the first message;

identifying the first class based on the second class by referencing a second properties file;

analyzing the first class to identify the first attribute of the first class and a second method of the first class;

constructing a third object of the first class;

invoking the second method on the third object to assign the value of the first attribute of the third object based on the value of the second attribute of the second object; and transmitting the third object in a second message in response to receiving the third object.

7. A computer implemented method of processing a healthcare management information system transaction, comprising:

receiving a transaction request comprising a parameter value;

constructing a first object of a first class, wherein the first class is associated with a first software technology;

assigning the parameter value to a first attribute of the first object;

identifying a second class based on the first class by referencing a first properties file, wherein the second class is associated with a second software technology;

analyzing the second class to identify a second attribute of the second class and a first method of the second class;

constructing a second object of the second class;

invoking the first method on the second object to assign the value of the second attribute of the second object based on the value of the first attribute of the first object; and transmitting the second object in a first message, wherein a portal layer performs the receiving of the transaction request and transmits the second object in the first message to a process layer, wherein a property loader component identifies the second class in response to a first converter component invoking the property loader component, and wherein the first converter component constructs the second object and invokes the first method on the second object.

8. The method of claim 6, wherein the parameter value is a demographics object comprising at least one of a name, an address, a sex, and an age.

9. The method of claim 6, further comprising:

constructing a fourth object of a third class, wherein the third class is associated with the first software technology;

assigning a result of processing the transaction request to a third attribute of the fourth object;

transmitting the fourth object to a process layer; and transmitting the fourth object to a portal layer.

10. The method of claim 6, further comprising:

constructing a fourth object of a third class, wherein the third class is associated with the first software technology;

assigning a result of processing the transaction request to a third attribute of the fourth object;

identifying a fourth class based on the third class by referencing the first properties file, wherein the fourth class is associated with the second software technology;

analyzing the fourth class to identify a fourth attribute of the fourth class and a third method of the fourth class;

constructing a fourth object of the fourth class;

invoking the third method to assign the value of the fourth attribute of the fourth object based on the value of the third attribute of the third object;

returning the fourth object to a process layer;

identifying the third class based on the fourth class by referencing the second properties file;

analyzing the third class to identify the third attribute of the third class and a fourth method of the third class;

constructing a fifth object of the third class;

invoking the fourth method to assign the value of the third attribute of the fifth object based on the value of the fourth attribute of the fourth object; and transmitting the fifth object in a message to the portal layer in response to receiving the fifth object, whereby a result of the transaction is returned to the portal layer.

11. The method of claim 10, wherein the portal layer executes on a portal server, and the process layer executes on a process server.

12. The method of claim 6, wherein the first object comprises a plurality of objects.

13. The method of claim 6, wherein the first object comprises an array of objects.

14. The method of claim 6, wherein the transaction request is one of a request to initiate a new member, a request to initiate a new provider, a request to initiate a new claim, a request to update member information, a request to update provider information, a request to update a claim, and a request to process a claim.

15. A computer program product, comprising a non-transitory computer usable medium having a computer readable program code embodied therein, the non-transitory computer readable program code adapted to be executed to implement a method for converting between data objects constructed according to different software technologies, the method comprising:

provide a system, wherein the system comprises distinct software modules, and wherein the distinct software modules comprise a first converter module, a second converter module, and a properties loader module;

processing a first properties file to identify a first class associated with a first software technology based on a second class associated with a second software technology, wherein processing the first properties file is performed by the properties loader module in response to being called by the first converter module;

receiving, by the first converter module, the identification of the first class from the properties loader module;

analyzing, by the first converter module, the first class to identify a first attribute and a first method;

constructing, the first converter module a first object of the first class;

assigning, by the first converter module, a first value to the first attribute of the first object using the first method, wherein the first value is based on a second value of a second attribute of a second object of the second class;

constructing a third object of the first class;

invoking the second method on the third object to assign the value of the first attribute of the third object based on the value of the second attribute of the second object; and transmitting the third object in response to receiving the third object.

* * * * *